United States Patent [19]

Dahlhaus

[11] Patent Number: 5,611,548
[45] Date of Patent: Mar. 18, 1997

[54] SEALING ARRANGEMENT

[75] Inventor: Ulrich Dahlhaus, Edingen-Neckarshausen, Germany

[73] Assignee: Firma Carl Freudenberg, Germany

[21] Appl. No.: 533,976

[22] Filed: Sep. 26, 1995

[30] Foreign Application Priority Data

Oct. 31, 1994 [DE] Germany ............ 44 38 947.7

[51] Int. Cl.$^6$ ................ F16J 9/06; G01B 7/30
[52] U.S. Cl. .............. 277/152; 277/37; 324/207.25; 384/448
[58] Field of Search .............. 277/2, 37, 152, 277/153, 901; 384/448; 324/207.25

[56] References Cited

U.S. PATENT DOCUMENTS

| | | | |
|---|---|---|---|
| 4,940,936 | 7/1990 | Grillo et al. | 384/448 |
| 5,002,287 | 3/1991 | Eskilsson | 277/2 |
| 5,166,611 | 1/1992 | Kujawa, Jr. et al. | 384/448 |
| 5,201,529 | 4/1993 | Heinzen | 277/153 |
| 5,370,404 | 12/1994 | Klein et al. | 277/152 |
| 5,398,942 | 3/1995 | Duckwall et al. | 277/37 |
| 5,458,420 | 10/1995 | Otto | 277/2 |
| 5,470,157 | 11/1995 | Dougherty et al. | 384/448 |

Primary Examiner—Daniel G. DePumpo
Attorney, Agent, or Firm—Kenyon & Kenyon

[57] ABSTRACT

A sealing arrangement includes a radial shaft seal and a sensor ring for inductively detecting angular motion relative to a sensor. The radial shaft seal has at least one dynamically stressed sealing lip of an elastomeric material that is affixed to a radially extending limb of an essentially L-shaped reinforcement ring. An axially extending limb of the reinforcement ring is joined to a statically stressed seal. The axial limb is surrounded at least radially on the outside by an extrusion coating of elastomeric material, the sensor ring having an axial projection that extends radially on the inner side and at least partially surrounding the extrusion coating with radial prestressing. The radial shaft seal and the sensor ring form one unit that is capable of being preassembled, so as to allow them to be separated from one another, as needed, without being damaged.

22 Claims, 3 Drawing Sheets

5,611,548

SEALING ARRANGEMENT

BACKGROUND OF THE INVENTION

1. Field of the Invention

The present invention relates to a sealing arrangement comprising a radial shaft seal ring and a sensor ring for inductively detecting angular motion relative to a sensor. The radial shaft seal has at least one dynamically stressed sealing lip of elastomeric material that is affixed to a radially extending limb of an essentially L-shaped reinforcement ring. An axially extending limb of the reinforcement ring is joined to a statically stressed seal.

2. Description of the Prior Art

Sealing arrangements are generally known in which the reinforcement ring of the radial shaft seal also constitutes the sensor ring. The disadvantage of such a device is that when replacing the radial shaft seal, one has to replace the sensor ring, even though the sensor ring is not subject to any wear and tear conditioned upon service life. In addition, when recycling the two parts, it is difficult to separate the radial shaft seal from the sensor ring. Another disadvantage of the prior out device is that vibrations introduced by the structural member that is sealed off into the radial shaft seal are directly transmitted to the sensor ring, which is formed as a single piece with the reinforcement ring. As a result, malfunctions can result when inductively detecting angular motion.

SUMMARY OF THE INVENTION

The object of the present invention is to provide a sealing arrangement so as to avoid the disadvantages of the prior art, make the sealing arrangement simple to assemble and provide the sealing arrangement with good working properties over a long service life. Moreover, the aim of the present invention is to avoid the transmission of vibrations between the radial shaft seal and the sensor ring.

As a way of attaining the object of the present invention, an axial limb is surrounded at least radially on the outside by an extrusion coating of an elastomeric material. In addition, the sensor ring has an axial projection that extends on the radially inner side and at least partially surrounds the extrusion coating with radial prestressing. Furthermore, the radial shaft seal and the sensor ring form one unit that is capable of being preassembled, so as to allow them to be separated from one another as needed without being damaged. It is advantageous that the radial shaft seal, which is more prone to wear and tear than the sensor ring, can be replaced separately, while the same sensor ring is retained for the entire service life of the sealing arrangement. In the area of its axial projection, the sensor ring may be pressed on to the extrusion coating of the axial limb of the reinforcement ring. As a result, direct contact between the reinforcement ring and the sensor ring is avoided. The arrangement of the sensor ring on the elastomeric extrusion coating ensures that vibration is not transmitted to the radial shaft seal. The vibration-damping properties of the extrusion coating result in an angular motion of the sensor ring past the sensor that is substantially free of vibrations. Measuring inaccuracies in detecting the angular motion are therefore reduced to a minimum.

The extrusion coating preferably extends over the entire axial length of the axial limb, and the sensor ring preferably has an essentially L-shaped design.

The axial projection preferably has smaller dimensions in the axial direction than the axial limb, and the extrusion coating overlaps is the front end of the axial projection in the radial direction in dependence upon manufacturing. It is advantageous that when the preassembleable unit, comprised of the radial shaft seal and the sensor ring, is pressed into the bore hole of a housing, the extrusion coating that projects above the front end of the axial projection sealingly engages the housing under radial prestressing. This guarantees reliable static sealing of the space to be sealed. The outer surface of the axial projection of the sensor ring, which is preferably made of a metallic material, is arranged on the side of the radially projecting extrusion coating facing away from the space to be sealed off and contacts the housing bore hole, fitting against it. This guarantees an exact concentric correspondence of the sensor ring to the bore hole of the housing, which does not change over the entire service life of the sealing arrangement. The extrusion coming can preferably completely surround the axial limb. By this arrangement the extrusion coating provides corrosion protection for the reinforcement ring.

The axial limb can be provided on the side facing away from the radial limb with an integrally premolded stop element extending radially outwardly. The stop element can have a smaller outside diameter than the axial projection of the sensor ring and the extrusion coating surrounding the stop element radially outwardly. The stop element prevents unwanted substantial accumulations of elastomeric material of the extrusion coating. This feature reduces the shrinkage caused in manufacturing following the vulcanization of the extrusion coating and results in more exact geometric dimensions for the extrusion coating. The sensor ring is pushed, with its axial projection in the mounting direction, over the peripheral-side extrusion coating of the reinforcement ring until it comes to rest against the stop element that is extrusion-coated with elastomeric material. The core-shaped stop element prevents unacceptably large elastic deformations of the extrusion coating, which could lead to an imprecise positioning of the sensor ring and the radial shaft seal relative to one another. The stop element likewise effects an improvement of the sealing between the radial shaft seal and the bore hole, since the extrusion coating has an improved dimensional stability in the sealing area with respect to the housing and because manifestations of relaxation remain negligibly small.

The stop element and the axially proximate front end of the axial projection can be disposed adjacently to one another with axial clearance, the gap formed by the clearance being completely filled in with the material of the extrusion coating. This prevents direct contact between the stop element of the reinforcement ring and the front-end delimitation of the axial projection. The extrusion coating of vibration-damping material promotes the reduction of vibrations introduced into the sensor ring and, as a result, effects improved working properties for the sealing arrangement with respect to the inductive detection of angular motion.

The extrusion coating and the axial projection can be joined together through form locking, the extrusion coating having on the outside, for example, an axially extending, wavelike or undulatory profile. The front end of the axial projection facing the space to be sealed off can abut with elastic prestressing against the stop element surrounded by the extrusion coating. The wavelike profile may engage with at least one congruently formed depression in the profile of the inner circumference of the axial projection. It is advantageous if, even when a preassembled unit comprised of a radial shaft seal and sensor ring is not installed, the parts are held together undetachably.

The last wave of the extrusion coating on the side facing away from the stop element can preferably have a larger extent in the radial direction than the axially adjacent waves, the last wave engaging a groove-shaped depression in the inner circumference of the axial projection. It is advantageous that the axially adjacent waves form sealing labyrinths with the cylindrical inner diameter of the axial projection, which guarantee an improved protection against leakage of the medium to be sealed off.

With respect to simple manufacturing of the radial shaft seal, the dynamically stressed sealing lip, the extrusion coating, and the statically stressed seal can be formed of a uniform material and integrally in one piece.

The from ends of the radial shaft seal and the sensor ring facing away from the space to be sealed off can be arranged in one radial plane. It is advantageous if the entire unit that is capable of being preassembled is designed to have a substantially smooth surface on the side facing away from the space to be sealed off, making it more difficult for impurities to accumulate.

The radial projection of the sensor ring can extend to the outside. This allows the radial shaft seal to be easily removed, for example, by first removing the axle or shaft to be sealed off and subsequently removing the radial shaft seal in a direction opposite that of the space to be sealed off.

According to another refinement, the radial projection of the sensor ring can extend to the inside and the sealing surface of the structural element to be dynamically sealed off can be approached right down to a small radial clearance. The annular gap formed by the clearance can be so narrow that it has a capillary effect and constitutes an intermediate, series, seal for the dynamically stressed sealing lip of the radial shaft seal. Besides a prolonged service life for the radial shaft seal, it is advantageous that the unit that is capable of being preassembled has especially compact dimensions in the radial direction.

The sensor ring can consist of metallic material and essentially have a disk-shaped design, the radial projection being uniformly broken through by recesses arranged in the circumferential direction.

If the radial projection of the sensor ring extends to the inside, the recesses can be completely filled in by the material of the extrusion coating. The advantage of such a refinement as far as the exact inductive detection of angular motion is concerned should be emphasized. Impurities cannot accumulate in the recesses and lead to measuring errors. The recesses, which are completely filled in by the material of the extrusion coating, are especially advantageous when the sealing arrangement is used to detect the angular motion of a wheel of a building-site vehicle.

The radial shaft seal and the sensor ring can be simply assembled to form the unit that is capable of being preassembled, preferably by designing the radial shaft seal to snap into the sensor ring. When the radial shaft seal is replaced, it is first removed from the still pressed-in sensor ring, the new radial shaft seal being inserted axially into the axial projection of the sensor ring until the extrusion-coated stop element is snapped in behind the front end of the sensor ring facing the space to be sealed off.

To avoid damage to the extrusion coating of the stop element when the radial shaft seal is inserted into the sensor ring, the axial projection can have an abutting bevel radially on the outside on the side facing the space to be sealed off. The abutting bevel preferably forms a 45° angle with the axis of rotation of the sealing arrangement.

Preferably, the sealing arrangement is used as a wheel hub seal in a motor vehicle, the sensor ring being provided as a pulse generator for the anti-lock braking system.

BRIEF DESCRIPTION OF THE DRAWINGS

Three exemplary embodiments of the sealing arrangement according to the invention are clarified in greater detail in the following on the basis of the enclosed drawings.

DETAILED DESCRIPTION OF THE DRAWINGS

Figure 1:
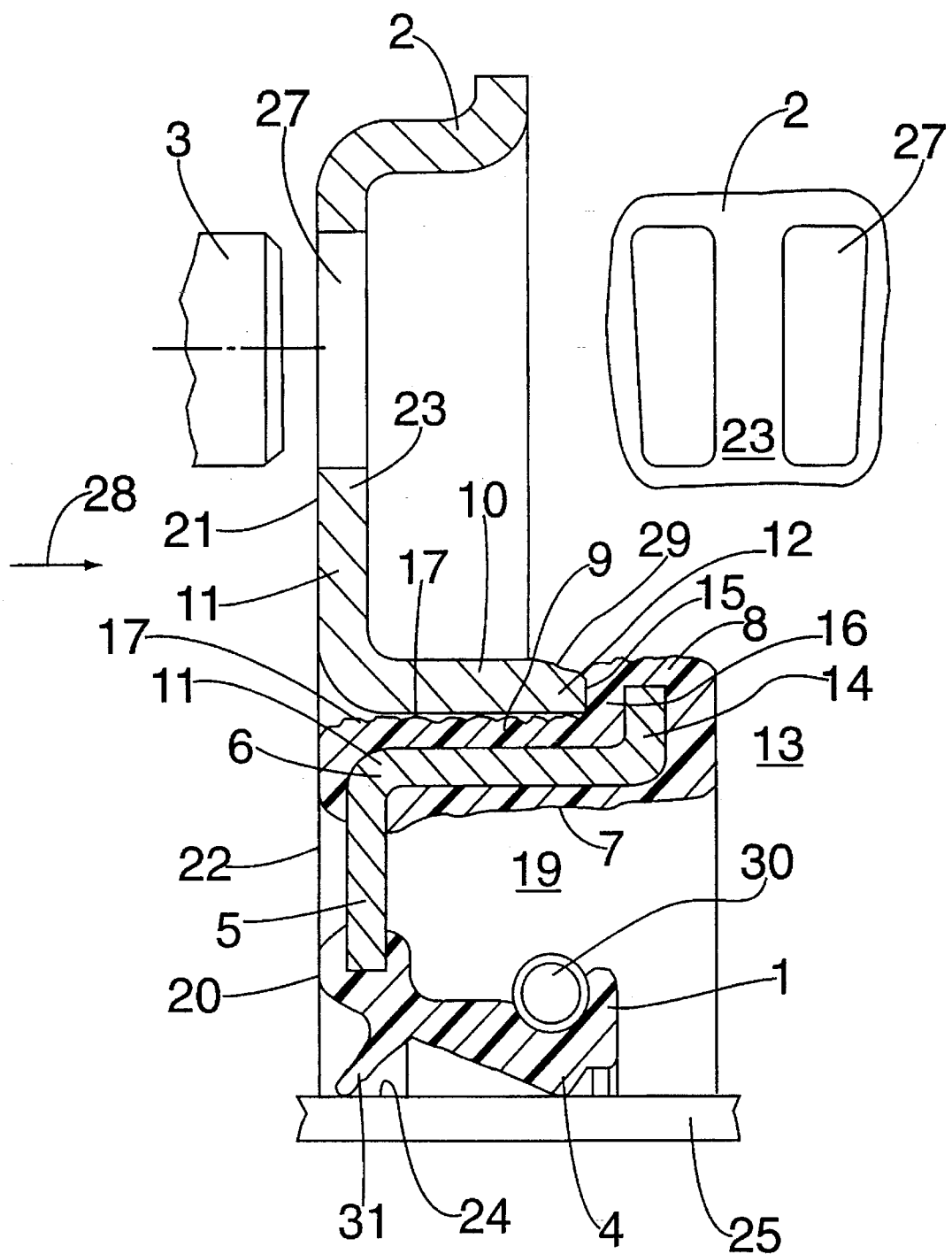
FIG. 1 shows a first exemplary embodiment of a sealing arrangement according to the present invention, which is used as a wheel hub seal in a motor vehicle, the sealing arrangement rotating around the structural element to be sealed off, which is designed as an axle. The sealing arrangement is pressed into the relatively rotatable wheel hub.
Figure 2:
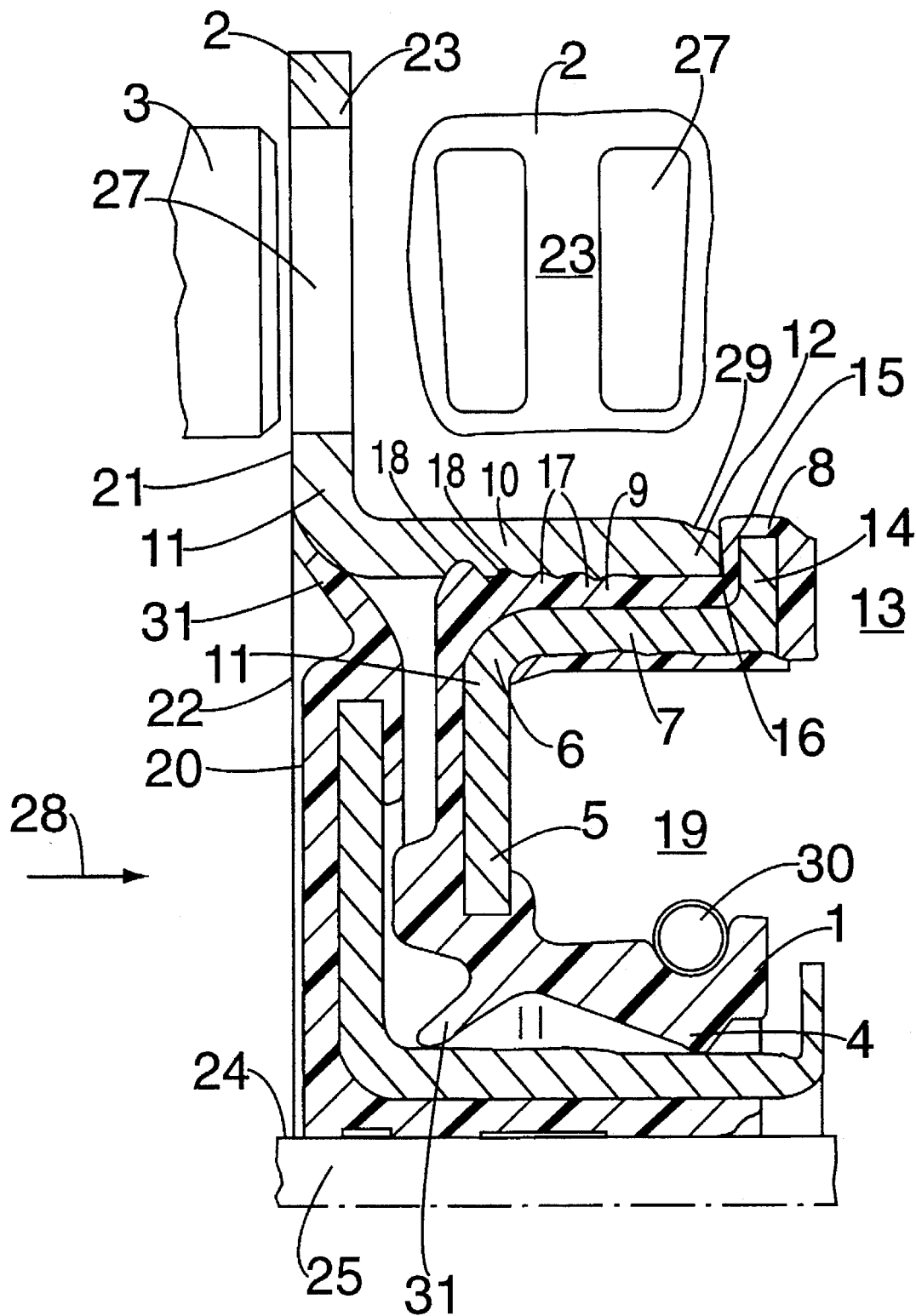
FIG. 2 illustrates a second exemplary embodiment of a sealing arrangement, the radial shaft seal being designed as a cassette or modular-type seal. The application of the sealing arrangement, as well as its functioning correspond essentially to the sealing arrangement of FIG. 1.
Figure 3:
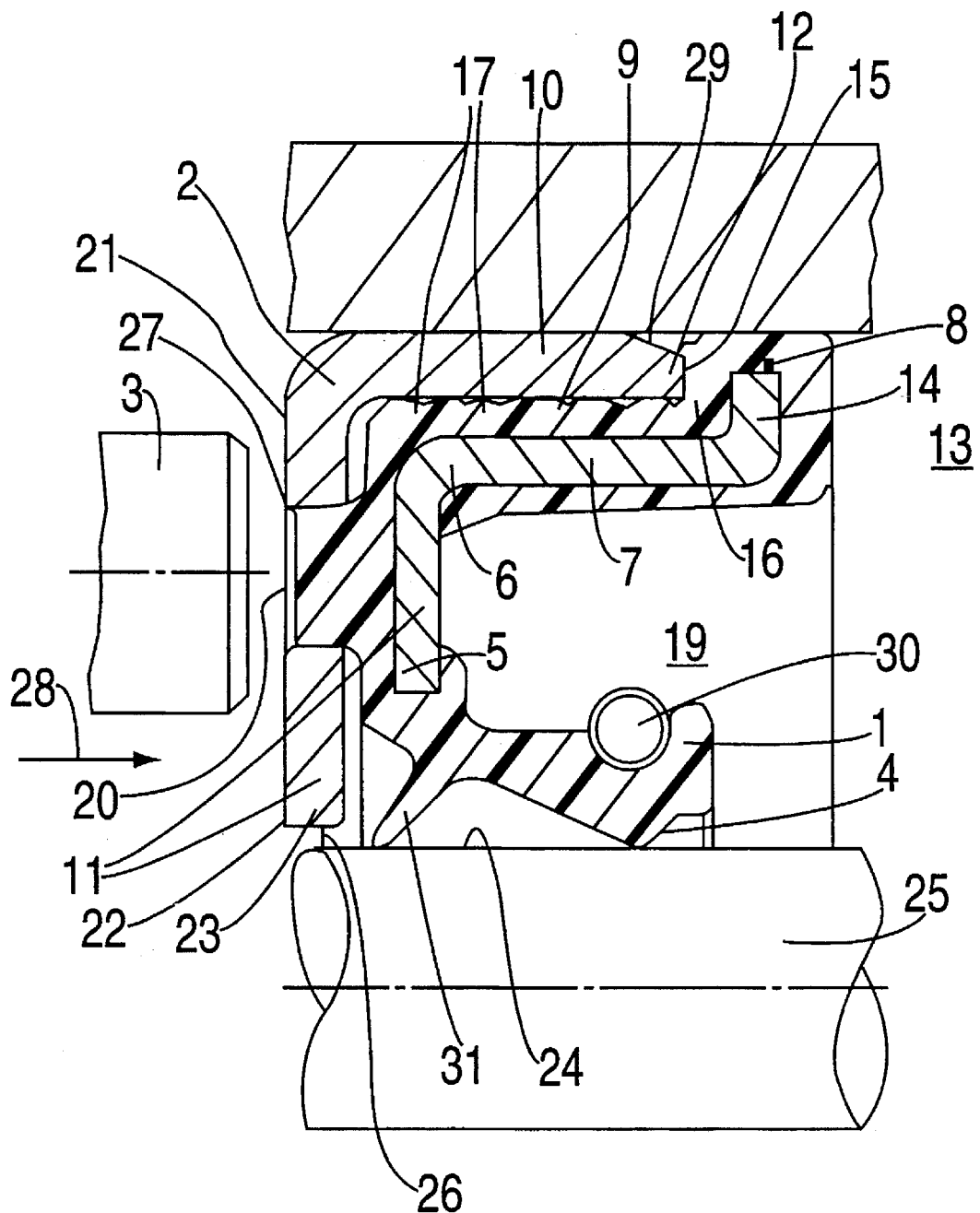
FIG. 3 depicts a third exemplary embodiment of a sealing arrangement, in which the radial projection of the sensor ring extends to the inside and forms an air-side intermediate seal for the radial shaft seal.

Each of FIGS. 1 to 3 shows a sealing arrangement which is used as a wheel hub seal in a motor vehicle. The sealing arrangement is pressed into a wheel hub (not shown), which rotates around an axle 25. The sealing arrangement includes a shaft sealing ring 1 and a sensor ring 2. Sensor ring 2 is a pulse generator for inductively detecting angular motion relative to a sensor 3 (shown schematically). The radial shaft seal 1 has a dynamically-stressed sealing lip 4, which sealingly surrounds the sealing surface 24 of the axle 25 to be sealed off. A dust shield lip 31 is arranged on the side of the sealing lip 4 facing away from the space 19 to be sealed off to protect the sealing lip 4 from external impurities and thereby prolong service life. In the exemplary embodiments shown in FIG. 1, the radial shaft seals 1 are each provided with a reinforcement ring 6 of metallic material, which essentially has an L-shaped profile. Provided on the side of the axial limb 7 facing the space 19 to be sealed off is a stop 14. The stop 14 is integrally formed in one piece with the reinforcement ring 6 and extends radially outward. The axial limb 7 of the reinforcement ring 6 is completely surrounded by an extrusion coating 9 of elastomeric material, which in the exemplary embodiments shown here constitutes a component of the statically stressed seal 8. In the exemplary embodiments according to FIG. 1 to 3, the sensor ring 2 is also essentially designed in an L-shape and, with its axial projection 10, surrounds the extrusion coating 9 under radial prestressing. The radial shaft seal 1 and the sensor ring 2 form a unit 11, which is capable of being preassembled and makes it possible to separate shaft seal 1 and sensor ring 2 from one another, as needed, without damage.

In FIG. 1, the extrusion coating 9 of the axial limb 7 is provided radially on the outside with a wavelike or undulatory profile 17, which fits sealingly on a boundary wall of a bore hole of a housing in the vicinity of the stop element 14, under radial prestressing.

FIG. 2 depicts a sealing arrangement similar to the sealing arrangement of FIG. 1, the radial shaft seal 1 being designed as a cassette seal. The sensor ring 2 pressed on to the radial shaft seal 1 is pushed, when assembled, in the direction of the space 19 to be sealed off, until its front end 15 abuts on the extrusion coating 9 of the stop element 14. On the side facing away from the space 19 to be sealed off, the wavelike profile 17 has a wave shape 18, which is able to snap with form locking into a congruently formed depression of the sensor ring 2. The details of the cassette seal feature of the embodiment of FIG. 2 are shown and described in U.S. patent application Ser. Nos. 08/264,535 and 08/264,668, which are incorporated herein by reference.

In FIG. 3, the radial projection 23 of the sensor ring 2 extends radially to the inside and closely approaches the sealing surface 24 of the structural element 25 to be dynamically sealed off, leaving a small radial clearance. The annular gap 26 bounded by the structural element 25 to be sealed off and the radial projection 23 forms an intermediate seal for the radial shaft seal 1. The recesses 27 of the sensor ring 2 are completely filled in by the elastomeric material of the extrusion coating 9 to ensure that functioning is not adversely effected by the ingress of dirt.

In the exemplary embodiments according to FIG. 1 to 3, the axial projection 10 has a leading bevel 29 radially on the outside, in the mounting direction 28, of the radial shaft seal 1 on the side facing the space to be sealed off.

I claim:

1. A sealing arrangement for a structural element comprising:

a radial shaft seal, said radial shaft seal comprising at least one dynamically stressed sealing lip made of an elastomeric material, said radial shaft seal further comprising an essentially L-shaped reinforcement ring, said reinforcement ring comprising axially and radially extending limbs, said dynamically stressed sealing lip being affixed to said radially extending limb of said reinforcement ring, said axially extending limb of said reinforcement ring being joined to a statically stressed seal, said axially extending limb being surrounded at least radially by an extrusion coating of elastomeric material; and a sensor ring used for inductive detecting of angular motion relative to a sensor, said sensor ring having an axial projection, said axial projection at least partially surrounding said extrusion coating with radial pre-stressing, said radial shaft seal and said sensor ring being capable of preassembly so as to allow said radial shaft seal and said sensor ring to be separated from one another as needed without being damaged, a radial projection of said sensor ring comprising uniformly-spaced portions of different inductance arranged in a circumferential direction.

2. The sealing arrangement of claim 1, wherein:

said axial projection has smaller dimensions in an axial direction than said axially extending limb.

3. The sealing arrangement of claim 1, wherein:

said extrusion coating overlaps an end of said axial projection.

4. The sealing arrangement of claim 1, wherein:

said extrusion coating completely covers said axially extending limb.

5. The sealing arrangement of claim 1, wherein:

said axially extending limb is provided on a side facing away from said radial limb with an integrally formed stop extending radially outwardly.

6. The sealing arrangement of claim 5, wherein:

said stop has a smaller outside diameter than said axial projection.

7. The sealing arrangement of claim 5, wherein:

said extrusion coating surrounds said stop.

8. The sealing arrangement of claims 5, wherein:

said stop and an end of said axial projection are disposed adjacent to one another with axial clearance, a gap formed by said axial clearance being completely filled in with material of said extrusion coating.

9. The sealing arrangement of claim 1, wherein:

said extrusion coating and said axial projection are joined together by form locking.

10. The sealing arrangement of claim 9, wherein:

said extrusion coating has on a radially outward surface an axially extending, wavelike profile.

11. The sealing arrangement of claim 10, wherein:

said wavelike profile engages a congruently formed profile on an inner circumference of said axial projection.

12. The sealing arrangement of claim 1, wherein:

said dynamically stressed sealing lip, said extrusion coating, and said statically stressed seal are formed of a uniform material and integrally as one piece.

13. The sealing arrangement of claim 1, wherein:

a surface of said radial shaft seal and a surface of said sensor ring facing away from a space be sealed off are arranged in one radial plane.

14. The sealing arrangement of claim 1, wherein:

a radial projection of said sensor ring extends outside of said radial shaft seal.

15. The sealing arrangement of claim 1, wherein:

a radial projection of the sensor ring extends inside of said radial shaft seal and a radially outward surface of said structural element is separated from a radially inward surface of said radial projection by a small radial clearance.

16. The sealing arrangement of claim 15, wherein:

an annular gap formed by said radial clearance is narrow enough to provide a capillary effect and acts as an intermediate seal for said radial shaft seal.

17. The sealing arrangement of claim 1, wherein:

said radial shaft seal snaps into said sensor ring.

18. The sealing arrangement of claim 17, wherein:

said extrusion coating snaps in behind said axial projection, and said extrusion coating projects over said axial projection in the radial direction.

19. The sealing arrangement of claim 17, wherein:

said axial projection has a bevel.

20. The sealing arrangement of claim 1, wherein:

said sealing arrangement is a wheel hub seal in a motor vehicle.

21. A sealing arrangement for a structural element comprising:

a radial shaft seal, said radial shaft seal comprising at least one dynamically stressed sealing lip made of an elastomeric material, said radial shaft seal further comprising an essentially L-shaped reinforcement ring, said reinforcement ring comprising axially and radially extending limbs, said dynamically stressed sealing lip being affixed to said radially extending limb of said reinforcement ring, said axially extending limb of said reinforcement ring being joined to a statically stressed seal, said axially extending limb being surrounded at least radially by an extrusion coating of elastomeric material; and a sensor ring used for inductive detecting of angular motion relative to a sensor, said sensor ring having an axial projection, said axial projection at least partially surrounding said extrusion coating with radial pre-stressing, said radial shaft seal and said sensor ring being capable of preassembly so as to allow said radial shaft seal and said sensor ring to be separated from one another as needed without being damaged, said sensor ring comprising a metallic material and having a disk-shaped design, wherein a radial projection of said sensor ring comprises uniformly-spaced recesses arranged in a circumferential direction.

22. The sealing arrangement of claim 21, wherein: said recesses are completely filled in by material of said extrusion coating.

* * * * *